June 18, 1963 W. E. GORDON 3,093,995
APPARATUS FOR MEASURING THE COEFFICIENT OF
RESTITUTION OF A RESILIENT BODY
Filed July 22, 1960 2 Sheets-Sheet 1

GOLF STROKE

SIMILAR STROKE ON MACHINE

INVENTOR.
William E. Gordon
BY
Agent

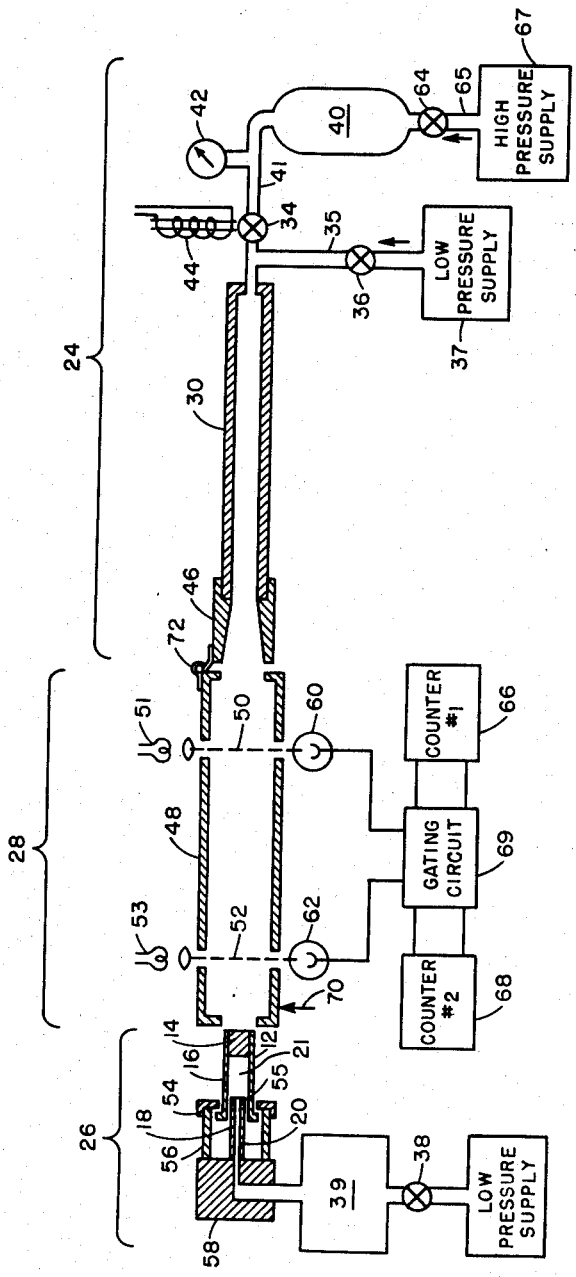

United States Patent Office 3,093,995
Patented June 18, 1963

3,093,995
APPARATUS FOR MEASURING THE COEFFICIENT OF RESTITUTION OF A RESILIENT BODY
William E. Gordon, Winchester, Mass., assignor, by mesne assignments, to United States Golf Association, New York, N.Y.
Filed July 22, 1960, Ser. No. 44,783
4 Claims. (Cl. 73—13)

This invention relates to apparatus for measuring certain physical properties of a relatively soft resilient body which is intended to be driven or impelled by a driving or striking object which is considerably harder than the driven resilient body. More generally, the resilient body is impelled by virtue of relative motion towards each other of the driving object and the driven resilient body. In particular, this invention has to do with a method and apparatus for measuring the coefficient of restitution of resilient bodies such as golf balls, baseballs, tennis balls and the like which are struck by driving objects such as clubs, bats, etc. and which require a high degree of resilience to make them satisfactory for use.

This invention is especially useful in measuring the coefficient of restitution of spherical resilient bodies, inasmuch as non-spherical bodies introduce into the measurements other factors that inhibit certain features of the method. Particular use for this invention is found in the testing of golf balls, and it will be described in detail in connection therewith. It should be understood, however, that the invention is similarly useful and may be operated in the same fashion for the testing of other spherical resilient bodies, such as those already mentioned.

It is generally conceded that, in the game of golf, the balls used by various players must be uniform if the game is to be fair. Standardization is thus essential. It is also well known, and has been for several years, that the very long drives in modern golf are tending to make some of the best old courses obsolete. Thus, it is important to assure that this problem is not aggravated by the development of more perfectly resilient golf balls than those now in use which would tend to make drives even longer. It is also recognized that with the possible use in the future of newly developed synthetic elastomers in the construction of golf balls, quite different impact properties might be produced which would have an undesirable effect on the game. The present invention provides a means and method for examining the coefficient of restitution of golf balls over the entire range of impact speeds encountered in the game—i.e. the "restitution profile" of each ball tested. Thus it becomes possible to predict how a given ball will behave when it is struck by the long hitter as well as by the average golfer. This invention therefore makes it possible to specify completely the resilience properties of the ball under all conditions of play and to control the manufacture of golf balls so that they conform to such specifications.

Various types of impact or striking apparatus have been designed for testing golf balls. These machines have had one or another disadvantage, such as lack of flexibility, or complexity of operation. One such apparatus, although capable of giving reasonably accurate results, requires a carefully trained operator in order to attain them. Another apparatus is capable of operating at only a single velocity of impact, and hence cannot effectively provide a test over a wide range of velocities. Other drawbacks of previous apparatus are large size and weight, so that removal from one testing site to another is out of the question for most practical purposes. Furthermore, in some instances the apparatus requires such careful adjustment that moving it from place to place is apt to result in errors of performance.

A particularly serious drawback of certain types of apparatus is the narrow and arbitrary nature of the test concept. A test should of course be related closely to actual conditions of use. But, also, insofar as possible, it should be described and formulated in terms of well known physical laws and concepts. The test then becomes relatively independent of the detailed design of the test device and can be accurately reproduced by anyone who understands the principles involved. Some test devices which have been used for golf balls do not meet this requirement. For example, in one such machine, the ball is given a "standard" blow by the machine and the velocity is then measured. This test therefore relates specifically to this particular apparatus and no other. Changes in the test machine due to wear and other factors can cause variations in the results of the test and can therefore lead to unintentional changes in the standards. Furthermore, only if the "standard" machine is closely duplicated in many important details, can a comparable result be obtained on another machine.

It is therefore an object of this invention to provide apparatus for measuring certain physical characteristics of golf balls and like resilient bodies.

It is another object to provide a test apparatus, based on well known physical laws, which is simple in principle, and which can be modified in details without changing the validity of the results.

Another object is to provide an apparatus that is basically accurate, and in which the accuracy does not depend critically on the precise functioning of the apparatus.

Another object is to provide such apparatus which will be simple in operation so that little or no special training is required to operate it.

Still another object is to provide such apparatus which is portable and which does not readily get out of adjustment when moved under ordinary precautions.

A further object is to provide apparatus whereby the physical characteristics can be accurately ascertained over the full range of velocities to which the resilient body is likely to be subjected in use.

More specifically, an object of this invention is to provide a machine for testing golf balls, which is superior to known testing apparatus in the way in which it reproduces playing conditions, in its smaller size and greater convenience of use, and especially in its inherent accuracy.

Other objects will appear from the following description.

In the system of the present invention, the golf ball or other resilient body being tested is not struck by the driving means, as it is in testing apparatus hitherto used. Instead, the ball is ejected, as by compressed air or a spring, from a "gun" or equivalent propelling means, to strike an essentially free target and rebound therefrom. The ball is clocked electronically in its travel over a measured course approaching the target and rebounding from it. The coefficient of restitution, $e$, is then obtainable using the formula $$e = \left(1 + \frac{t_1}{t_2}\right)(1+f) - 1 \qquad (1)$$

wherein $t_1$ and $t_2$ are the times of travel by the incident and the rebounding ball, respectively, over the same measured course but in opposite direction, and $f$ is the ratio of the mass of the ball to the mass of the target.

Reasons for using this type of apparatus, and the derivation of the equation applicable to its use, are explained below. In this connection, reference is made to the accompanying drawings, which are illustrative rather than limiting, and in which:

FIG. 3 represents a side view of an exemplary apparatus of this invention;

Figure 1:
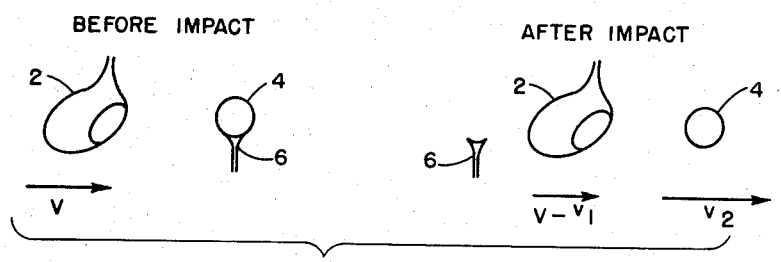
FIG. 1 represents diagrammatically the velocities in a golf stroke, before and after impact.
Figure 2:
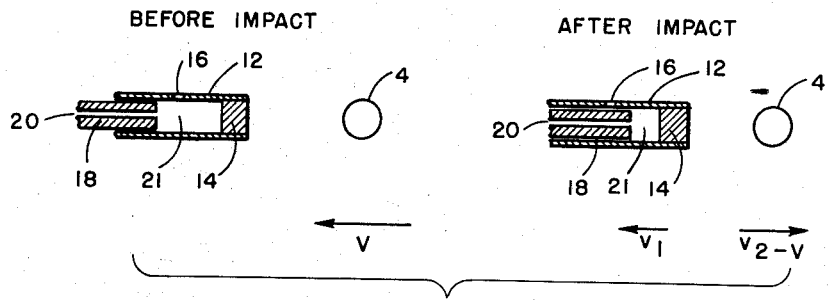
FIG. 2 represents the velocities in a similar stroke on the apparatus (shown purely schematically, and in part only) of this invention.

The apparatus is designed to closely resemble a golf stroke insofar as the compression and restitution of the ball during impact are concerned. A comparison of the golf stroke and the action of the machine is illustrated by FIG. 1 and FIG. 2. Suppose that the golf club head 2 in FIG. 1 has a velocity just before impact of V. It strikes the ball 4 resting on the tee 6 and imparts to it a velocity of $v_2$. As a result of the impact, the club head is slowed down by an amount $v_1$ and therefore has a resultant velocity after impact of $(V-v_1)$. In FIG. 2, an exactly similar stroke on the machine is illustrated. However, in this case the ball has an initial velocity before impact of V as imparted to it by the gun. The ball impinges on the head of the target 14 which is attached to a sleeve 12 which slides freely on a stationary piston 18. The moving part of the target, inclusive of the head 14 and the sleeve 12, is designed to have a total mass of M equal to that of the golf club head in FIG. 1. This being so, viz., the mass of the moving part of the target in FIG. 2 being equal to that of club head in FIG. 1, the impact of the ball initially moving toward the target at a velocity V will impart to the target on impact a velocity $v_1$ exactly equal to the amount by which the club head is slowed down on impact as in FIG. 1. This result follows from the simple laws of mechanics. By the same reasoning, the ball, after impact on the target, will be given a velocity $(v_2-V)$ in the opposite direction, or a total change in velocity of $v_2$ just as it received in impact with the club as pictured in FIG. 1.

The coefficient of restitution $e$ being defined as $$e = \frac{\text{relative velocity of striking objects after impact}}{\text{relative velocity of striking objects before impact}} \quad (2)$$

it is readily shown that for the situation illustrated both in FIG. 1 and FIG. 2.

$$e = \frac{v_2 + v_1}{V} - 1 \quad (3)$$

The law of conservation of momentum requires that momentum gained by the ball of mass $m$, namely $mv_2$, is equal to that lost by the club head or the target, namely $Mv_1$. Hence, $$\frac{v_1}{v_2} = \frac{m}{M} \quad (4)$$

When appropriate substitutions from Equation 4 are made in Equation 3, one obtains $$e = \frac{v_2}{V}(1+f) - 1 \quad (5)$$

where $f$ is defined as being equal to $m/M$.

On the machine, the ball with a velocity V is clocked in the forward direction and requires a time interval $t_1$ to cover a measured distance. On the return, when it has a velocity $(v_2-V)$, it covers the same distance in the reverse direction in a time $t_2$. Since the time required to cover a given distance is in inverse proportion to the velocity, it follows that $$\frac{t_1}{t_2} = \frac{v_2 - V}{V} = \frac{v_2}{V} - 1 \quad (6)$$

When the value of $$\frac{v_2}{V}$$

from Equation 6 is substituted in Equation 5, one obtains $$e = \left(1 + \frac{t_1}{t_2}\right)(1+f) - 1$$

which is identical with Equation 1.

In the foregoing discussion, it has been assumed that for purposes of analyzing the impact of a golf club with a ball, only the head of the club need be considered. Although this assumption is not rigorous, it can be shown by rather elementary physical arguments that the upper parts of the club shaft, and the golfer's hands, arms and body have a vanishingly small effect on the phenomenon of impact during the very brief interval, about 0.0004 second, when the club and ball are in contact. High speed motion pictures also verify this fact. Therefore, one is justified when attempting to simulate the impact of the ball and club to neglect such factors as the flexibility of the club shaft and the grip of the hands on the club, and to regard the impact as one between two bodies free to move without restraint.

Although the upper parts of the club shaft have a negligible influence on the impact, the lower parts of the shaft become increasingly important in relation to their proximity to the club head. The main effect is simply inertial, and the question reduces to: what is the effective mass of the club head? It is found from the analysis of actual golf strokes that the average driving club head has an effective mass about four to five times that of the ball. The mass of the target on the test apparatus should therefore lie in this range. Although the actual mass of the target on the machine must be accurately known in order to evaluate the factor $f$ in Equation 1, the precise choice is not critical since it has been found from experiment that the value of $e$ obtained for a given ball is not appreciably dependent on the mass of the target within the range of interest.

As pointed out above, the target should be able to move essentially free from restraints. This need be true, however, only during the brief time that the target is in contact with the ball. Furthermore, while the restraining forces on the target should be negligibly small compared to the impact forces between ball and target, this condition is easily met in practice because the impact forces are so large, being of the order of a few tons. Thus, small forces due to friction have negligible effect. It is also quite practical to introduce a pneumatic cushion or spring to bring the target to rest, without appreciably affecting the operation of the device. The arrangement in FIG. 2 depicts an example of means for doing this. The arresting mechanism in this case is a pneumatic damper, the air in the cylinder 12 being forced through a capillary pipe 20. In order to reduce the restraining force on the target 14 while the target is in contact with the ball 4, the device illustrated in FIG. 2 also provides an orifice 16 which allows air to escape and prevents buildup of pressure in the chamber or cylinder 21 until the target 14 has travelled to a point where the orifice is covered by the piston 18. When the target 14 has reached this point, the ball 4 is no longer in contact with it and the subsequent buildup of pressure in the damping chamber or cylinder 21 cannot affect the rebound.

An exemplary embodiment of this invention, not to be considered limiting in any of its details, is depicted in FIG. 3. The apparatus consists of three main parts: the gun assembly 24, the target assembly 26, and the clocking device 28.

The gun assembly 24 consists principally of a gun barrel 30 and conduit means for supplying compressed gas (e.g. air or nitrogen) to the barrel for propelling the ball to be tested. The diameter of gun barrel 30 is such that the ball to be tested can slide freely therein, but with a minimum of clearance. The ball is inserted into the barrel through the muzzle, and is propelled out of the gun by a sudden release of gas from the surge tank 40 through line 41 controlled by valve 34 which is activated by a solenoid 44. Pressure in the surge tank 40 is regulated by valve 64 which connects through line 65 with a compressor or other high pressure gas source 67. The pressure is measured by gauge 42. Quite reproducible initial velocities are obtained by regulation of the pressure; however, it will be understood that the accuracy of the restitution coefficient measurement does not depend on the accurate functioning of the gun mechanism. The muzzle of the gun 30 is preferably flared, as by a conical insert 46, in order to catch the ball on its rebound flight and direct it back into the gun barrel. The ball is brought to rest by the damping effect of the air in the gun barrel and is usually expelled gently again, by the pressure of this air, through the muzzle 46 into the guard cage 48. In the event that the ball remains in the barrel, it can be expelled by application of low pressure gas from line 35 leading from source 37, applied by opening valve 36.

The main features of the target mechanism 26 (FIG. 3) have already been described above, with reference to FIG. 2, and are similarly numbered, and act as explained with respect to FIG. 2. The pneumatic damper is provided by the effect of forcing air through capillary 20, as indicated above regarding FIG. 2. This capillary leads into plenum means 39, which may be a large chamber or an extra length of pipe 20, for example. A restoring mechanism is provided to bring the target back to its initial position before each test. For example, in the apparatus of FIG. 3, the target 14 is restored by admitting low pressure air through pipe 20 controlled by valve 38, thus forcing the cylinder 12 outwards until it is brought to rest in the initial position by the stop 54. A bumper 55 of resilient rubber or the like on the end of the stationary piston 18 prevents damage to the target head if it should strike the piston after the impact. Piston 18 is fixed onto stationary block 58, and stop 54 is also fixed with respect to block 58 by collar or support 56. Block 58 does not move during any test.

The clocking mechanism 28 (FIG. 3) depends on light beams 50 and 52 furnished by lamps 51 and 53, respectively, and focused on photoelectric receivers 60 and 62, respectively. Interruption of a beam by the passage of the ball produces an electric signal which can be detected in a variety of ways. One convenient timing means, as illustrated schematically in FIG. 3, employs two electronic chronographic counters, 66, 68, arranged in conjunction with a gating circuit 69, in known manner. The first counter 66 is started when the ball first passes through beam 50; and this counter is stopped when the ball passes through beam 52. On the rebound of the ball, the second counter 68 is activated: it starts when the ball passes through beam 52 and stops when it passes through beam 50. The gating circuit 69 automatically switches the photoelectric signals from the first counter 66 to the second counter 68 after the ball first passes through beam 52. This gating circuit also immobilizes both counters after the rebound time has been recorded on the second counter 68, so that no further photoelectric signals can be recorded until the circuits are reset.

The cage 48 is provided for safety. It may be omitted if there is no fear of the ball missing the gun muzzle on rebound. It may have an interlock to prevent the firing of the gun when it is not in place. This interlock may comprise switch 70 in series with solenoid 44, so that when cage 48 is up, or out of position, the switch 70 is open, and when cage 48 is in the position shown, switch 70 is closed. The cage may be hinged at one end, as by hinge 72, so that after a test it can be tilted to allow the ball to drop out and be recovered. To prepare for the next test the ball is reinserted in the gun by any suitable means, such as a ramrod and the cage 48 is swung down, into the position shown, for firing.

Figure 4:
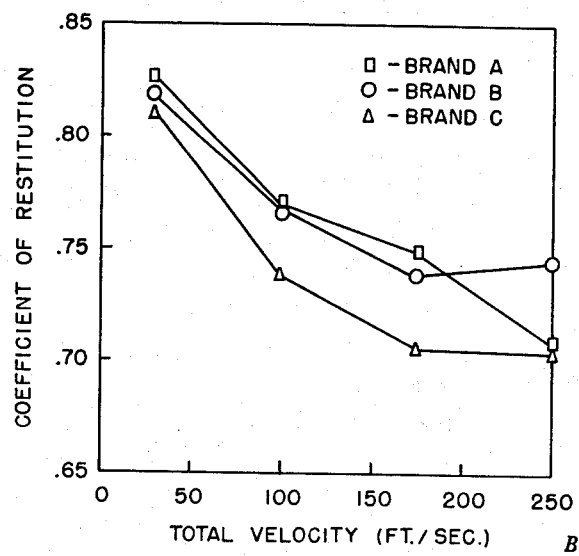
FIG. 4 is a graph of coefficient of restitution vs. total velocity in feet per second, plotted for three different brands of golf balls.

Results of tests on three different brands of golf balls are plotted in FIG. 4, showing coefficient of restitution, $e$, against total velocity in feet per second. The total velocity is represented by $v_2$ in FIG. 1, i.e. it represents the velocity of the ball when struck by the head of a club in actual play. The data shown at 100, 175, and 250 feet per second were obtained by using the apparatus of this invention as described above. The data at 30 feet per second were obtained by dropping the ball to be tested onto a heavy steel plate and measuring the distance dropped ($h_1$) and the height to which the ball rebounds ($h_2$). In this test, $$e = \sqrt{\frac{h_2}{h_1}}$$

and the results are plotted at the 30 feet per second velocity.

Each of the four tests per brand shown in FIG. 4 is the average of tests on 12 different golf balls, each of which was subjected to a test at each of the four velocities. Hence 144 tests were made, and 36 balls were used for these tests. These tests show clearly that brand B is most nearly uniform throughout the velocity range, which obviously covers the entire range from light to heavy hitters. Brand C shows a lower coefficient of restitution than brand B at all velocities, and is thus obviously less resilient. The coefficient of restitution of brand A is comparable to that of brand B at medium and low velocities, but is sharply lower at high velocities, and hence tends to counteract the velocity advantage which a heavy hitter ordinarily has with a ball or more uniform coefficient of restitution, e.g. brand B.

The reproducibility of results obtained by testing with the apparatus and method of this invention have been demonstrated by a large number of tests. Typical of such tests and test results are those shown in the following table, wherein one golf ball was subjected to 10 successive shots in this apparatus, using a fixed pressure setting for the supply of compressed gas to the gun:

| Shot No. | $t_1$* | $t_2$* | $t_1/t_2$ | $e$ |
|---|---|---|---|---|
| 1 | 225 | 514 | 0.438 | 0.731 |
| 2 | 231 | 530 | 436 | 729 |
| 3 | 226 | 523 | 432 | 724 |
| 4 | 224 | 513 | 437 | 730 |
| 5 | 225 | 516 | 439 | 733 |
| 6 | 226 | 512 | 438 | 731 |
| 7 | 226 | 524 | 441 | 735 |
| 8 | 231 | 503 | 441 | 735 |
| 9 | 225 | 522 | 447 | 742 |
| 10 | 228 | 529 | 437 | 730 |
| Average | | | | 0.732 |
| Standard error | | | | 0.005 |

* Time measured in units of 0.000025 second.

It will be clear from the foregoing description of the principles of operation and design of this testing apparatus that it meets the objects of the invention to a marked degree. The operation and concept of the test are based entirely on well known and universally valid physical principles. The mechanical details of the apparatus are subject to wide modification without effect on the test itself. For example, the test does not depend for accuracy on the mechanical action of the gun or the target mechanism, since accuracy hinges only on the precision of the ratio $t_1/t_2$. Even the timing mechanism (the electronic counter chronograph in the example given) need not be accurate in an absolute sense, provided that it runs at a "uniform" rate during the forward motion of the ball and the rebound (a few hundredths of a second). In practice, if the apparatus functions at all, it is virtually certain to give the correct result. No calibrations are needed; no special skills are required of the operator. The apparatus can also be made reasonably portable. And, finally, with this apparatus it is possible to measure the restitution coefficient not just at one impact speed, but over the whole range of impact speeds encountered in real play.

I claim:

1. Apparatus for measuring the coefficient of restitution of a golf ball, comprising target means having a mass of approximately four to five times the weight of said golf ball, propelling means for propelling said golf ball against said target means, and means for measuring the time of travel of said golf ball toward and away from said target means through a predetermined travel distance, said target means being mounted to move in a direction in line with the line of travel of said golf ball, and having a plane impact surface facing said propelling means and perpendicular to said line of travel, an air chamber within said target means and in restricted communication with the ambient atmosphere, means associated with said chamber for decreasing its volume upon motion of said impact surface in a direction away from said propelling means, and cutoff means for blocking said restricted communication after a predetermined extent of said motion, said target means being free-moving during time of impact of said golf ball, and moving against air pressure after said golf ball has rebounded from said impact surface.

2. Apparatus in accordance with claim 1, further characterized in that pneumatic damping means are provided for further damping the motion of said impact surface after said restricted communication has been blocked.

3. Apparatus in accordance with claim 1, further characterized in that conduit means are provided for supplying air under pressure to said air chamber to restore said impact surface to its original position.

4. Apparatus in accordance with claim 3, further characterized in that said cutoff means comprises a piston mounted in sliding fit relation with the interior of said air chamber, and said piston comprises said conduit means, said conduit means being in the form of a capillary to provide said further damping.

References Cited in the file of this patent
UNITED STATES PATENTS

| | | |
|---|---|---|
| 1,152,979 | Royse | Sept. 7, 1915 |
| 2,314,063 | Anderson et al. | Mar. 16, 1943 |
| 2,517,545 | Cushman et al. | Aug. 8, 1950 |
| 2,656,711 | Tschudi | Oct. 27, 1953 |
| 2,740,287 | Gindraux | Apr. 3, 1956 |

OTHER REFERENCES

"High Speed Compression Tests on Copper," by Greenfield, Journal of Applied Physics 18, 645–648, July 1947. (Copy in Division 36.)